United States Patent
Kwon et al.

(10) Patent No.: US 10,600,573 B2
(45) Date of Patent: Mar. 24, 2020

(54) CAPACITOR COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Hyung Soon Kwon, Suwon-Si (KR); Hyoung Uk Kim, Suwon-Si (KR); Tae Young Ham, Suwon-Si (KR); Jong Han Kim, Suwon-Si (KR); Ki Myoung Yun, Suwon-Si (KR); Jae Sung Park, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 6 days.

(21) Appl. No.: 16/123,929

(22) Filed: Sep. 6, 2018

(65) Prior Publication Data
US 2019/0244757 A1    Aug. 8, 2019

(30) Foreign Application Priority Data

Feb. 8, 2018    (KR) .................. 10-2018-0015658

(51) Int. Cl.
*H01G 4/12*        (2006.01)
*H01G 4/30*        (2006.01)
(Continued)

(52) U.S. Cl.
CPC .......... *H01G 4/1227* (2013.01); *B32B 18/00* (2013.01); *C01G 23/003* (2013.01); *C04B 35/4682* (2013.01); *C04B 35/626* (2013.01); *H01G 4/008* (2013.01); *H01G 4/30* (2013.01); *B82Y 30/00* (2013.01); *C04B 2237/346* (2013.01); *C04B 2237/582* (2013.01); *C04B 2237/704* (2013.01)

(58) Field of Classification Search
None
See application file for complete search history.

(56) References Cited

U.S. PATENT DOCUMENTS 7,804,678 B2 *   9/2010   Wu .................. H01G 4/06
                                                361/311
8,390,984 B2 *   3/2013   Liu .................. H01G 4/1227
                                                361/311
(Continued)

FOREIGN PATENT DOCUMENTS

KR    10-2013-0040708 A    4/2013
KR    10-2014-0001896 A    1/2014
(Continued)

*Primary Examiner* — Dion Ferguson
(74) *Attorney, Agent, or Firm* — Morgan, Lewis & Bockius LLP

(57) ABSTRACT

A capacitor component includes a body in which a dielectric layer and an internal electrode are alternately stacked, and an external electrode disposed on the body and connected to the internal electrode. The dielectric layer includes a composite layer including a dielectric material powder and a metallic particle and first and second protective layers including a dielectric material powder and spaced apart by the composite layer. A thickness of each of the first and second protective layers is equal to or greater than 1/3 of a thickness of the dielectric layer.

13 Claims, 2 Drawing Sheets

(51) Int. Cl.
*H01G 4/008* (2006.01)
*C04B 35/468* (2006.01)
*C04B 35/626* (2006.01)
*B32B 18/00* (2006.01)
*C01G 23/00* (2006.01)
*B82Y 30/00* (2011.01)

(56) References Cited

U.S. PATENT DOCUMENTS

| | | | | |
|---|---|---|---|---|
| 2005/0063141 | A1* | 3/2005 | Jeong | H01L 28/40 361/312 |
| 2005/0152094 | A1* | 7/2005 | Jeong | H01G 4/10 361/312 |
| 2006/0185140 | A1* | 8/2006 | Andresakis | H01C 17/065 29/25.41 |
| 2007/0108490 | A1* | 5/2007 | Tan | H01G 4/20 257/296 |
| 2010/0214719 | A1* | 8/2010 | Kim | H01G 4/206 361/313 |
| 2011/0005817 | A1* | 1/2011 | Ito | H01G 4/005 174/257 |
| 2011/0032656 | A1* | 2/2011 | Ito | H01G 4/145 361/301.4 |
| 2013/0003254 | A1* | 1/2013 | Koutsaroff | C01G 23/006 361/281 |
| 2013/0094121 | A1 | 4/2013 | Endo et al. | |
| 2013/0294008 | A1* | 11/2013 | Kim | H01G 4/008 361/305 |
| 2014/0376150 | A1* | 12/2014 | Kim | H01G 4/30 361/301.4 |
| 2017/0011850 | A1* | 1/2017 | Kim | H01G 4/30 |

FOREIGN PATENT DOCUMENTS

KR    10-2016-0007219 A    1/2016
WO    2012/051176 A2    4/2012

* cited by examiner

CAPACITOR COMPONENT AND METHOD OF MANUFACTURING THE SAME

CROSS-REFERENCE TO RELATED APPLICATION(S)

This application claims the benefit of priority to Korean Patent Application No. 10-2018-0015658, filed on Feb. 8, 2018 in the Korean Intellectual Property Office, the disclosure of which is incorporated herein by reference in its entirety.

BACKGROUND

1. Field

The present disclosure relates to a capacitor component and a method of manufacturing the same.

2. Description of Related Art

A multilayer ceramic capacitor (MLCC), a type of capacitor component, is a chip-type capacitor mounted on a printed circuit board of various electronic products including an image device, e.g., a liquid crystal display (LCD) and a plasma display panel (PDP), a computer, a smartphone, and a cellular phone to charge or discharge electricity.

Such an MLCC is advantageously capable of ensuring high capacitance, of being miniaturized, and of being easily mounted and thus, is capable of being used as a component of various electronic devices. As various electronic devices such as computer and a mobile device are reduced in size and output high levels of power, there is an increasing need for miniaturization and high capacitance in an MLCC. To simultaneously achieve miniaturization and high capacitance of an MLCC, a dielectric material with a high dielectric constant needs to be used or the number of stacked layers or an electrode area needs to be increased but there is a limit in increasing the number of stacked layers or an electrode area in accordance with trends toward increased miniaturization.

Accordingly, there has been a continuous need for a dielectric material with a high dielectric constant, as compared with the prior art, but there has not been a material having a high dielectric constant and appropriate for use, as compared with a typical dielectric material of $BaTiO_3$.

Korean Patent Laid-Open Publication No. 2016-0007219 discloses a method for increasing a dielectric constant by distributing metallic particles in $BaTiO_3$ and adding a space charge effect at a $BaTiO_3$/metal interface.

However, according to Korean Patent Laid-Open Publication No. 2016-0007219, there is a problem in that a dielectric constant may be increased but reliability may be degraded.

SUMMARY

An aspect of the present disclosure may provide a capacitor component including a dielectric layer with an increased dielectric constant without degraded reliability.

According to an exemplary embodiment in the present disclosure, a capacitor component may include a body in which a dielectric layer and an internal electrode are alternately stacked, and an external electrode disposed on the body and connected to the internal electrode. The dielectric layer includes a composite layer including a first dielectric material and a metallic particle and first and second protective layers spaced apart by the composite layer and including a second dielectric material. A thickness of each of the first and second protective layers is equal to or greater than ⅓ of a thickness of the dielectric layer.

According to another exemplary embodiment in the present disclosure, a method of manufacturing a capacitor component may include preparing a protective layer paste including a first dielectric material powder, preparing a composite layer paste including a dielectric material powder and a metallic particles, coating the protective layer paste on a support member to form a first protective layer, coating the composite layer paste on the first protective layer to form a composite layer and, then, coating the protective layer paste on the composite layer to form a second protective layer, thereby producing a dielectric material sheet, coating a conductive paste on the dielectric material sheet to print an internal electrode, stacking and sintering the dielectric material sheet on which the internal electrode is printed to form a body, and forming an external electrode connected to the internal electrode on the body. A thickness of each of the first and second protective layers is equal to or greater than ⅓ of a thickness of the dielectric material.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
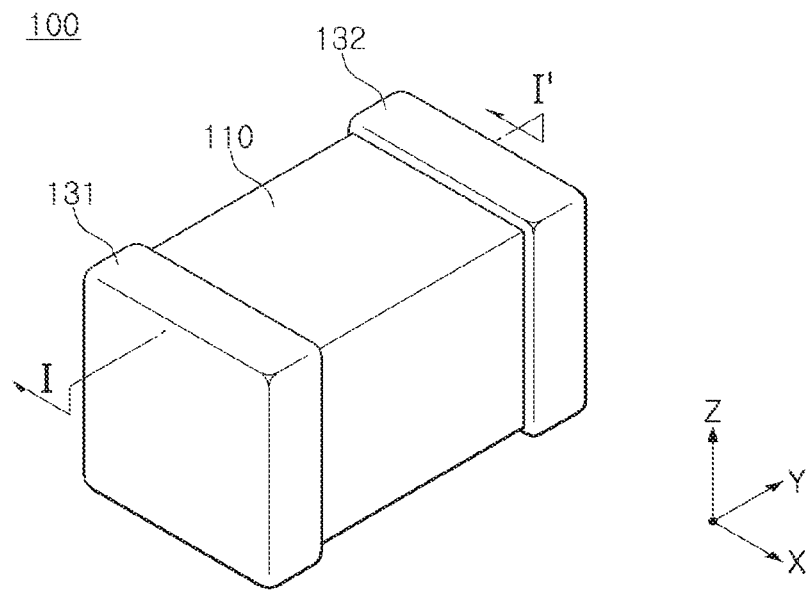
FIG. 1 is a schematic perspective view of a capacitor component according to an embodiment of the present disclosure.

Hereinafter, exemplary embodiments of the present disclosure will now be described in detail with reference to the accompanying drawings.

In the drawings, an X-axis direction is defined as a first direction or a longitudinal direction, a Y-axis direction is defined as a second direction or a width direction, and a Z-axis direction is defined as a third direction or a thickness direction.

Capacitor Component

Figure 2:
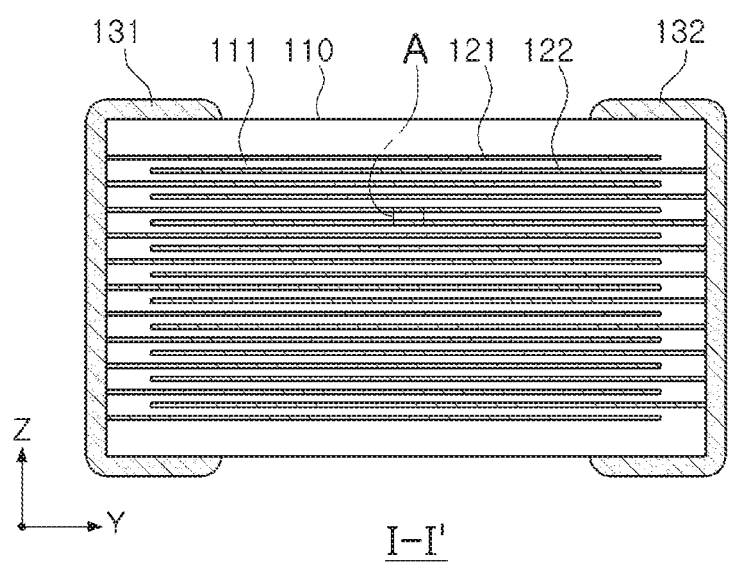
FIG. 2 is a cross-sectional view along line I-I' of FIG. 1.
Figure 3:
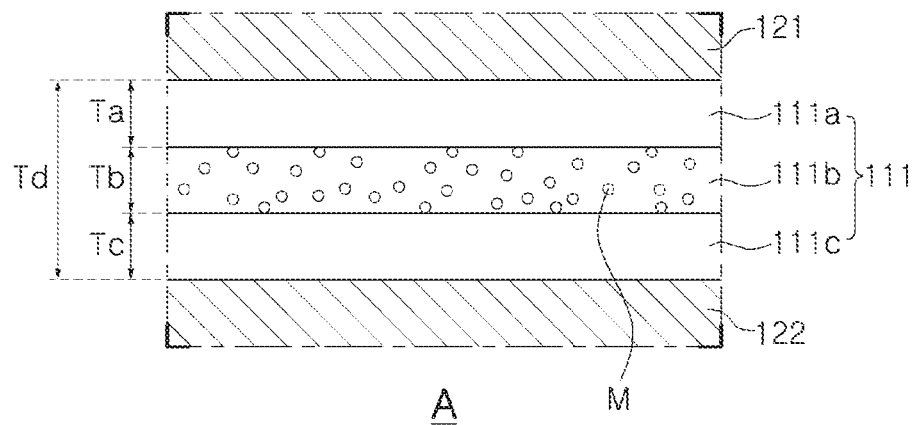
FIG. 3 is an enlarged view of portion 'A' of FIG. 2.

FIG. 1 is a schematic perspective view of a capacitor component according to an embodiment of the present disclosure. FIG. 2 is a cross-sectional view along line I-I' of FIG. 1. FIG. 3 is an enlarged view of portion 'A' of FIG. 2.

Referring to FIGS. 1 to 3, a capacitor component 100 according to an embodiment of the present disclosure may include a body 110 in which a dielectric layer 111 and internal electrodes 121 and 122 are alternately stacked, and external electrodes 131 and 132 disposed on the body 110 and connected to the internal electrodes 121 and 122. The dielectric layer 111 may include a composite layer 111b including a dielectric material and metallic particles M, and first and second protective layers 111a and 111c spaced apart by the composite layer 111b and including a dielectric material.

The body 110 may include the dielectric layer 111 and the internal electrodes 121 and 122 that are alternately stacked. The body 110 may include a multilayer structure in which the plurality of dielectric layers 111 are stacked and the first and second internal electrodes 121 and 122 that are alternately spaced apart across the dielectric layer 111.

A detailed shape of the body 110 is not particularly limited but the body 110 may have a hexahedral shape or a similar shape thereof as illustrated in the drawing. Ceramic powder particles included in the body 110 shrink during a sintering process and, thus, the body 110 may not have a hexahedral shape with a complete straight line but may have a substantially hexahedral shape.

The dielectric layer 111 may include the composite layer 111b including a first dielectric material and the metallic particles M, and the first and second protective layers 111a and 111c spaced apart by the composite layer 111b and including a second dielectric material, and a thickness of each of the first and second protective layers may be equal to or greater than ⅓ of a thickness of the dielectric layer.

The composite layer 111b may include the first dielectric material and the metallic particles M and, thus, may increase a dielectric constant of the dielectric layer.

The metallic particles M may increase a Schottky barrier of the dielectric material and a metallic particle surface to form a space charge layer around the metallic particles, thereby increasing the dielectric constant of the composition.

The Schottky barrier is a potential barrier generated when a metal and a semiconductor contact each other and, in this regard, when a metal and a semiconductor contact each other, carriers are moved to match Fermi levels of the two objects and a space charge layer is formed on a surface of the semiconductor, configuring the potential barrier.

Similar to the case in which a metal and a semiconductor contact each other, when a dielectric material and a metal particle contact each other, a Schottky barrier may also be generated on the dielectric material and a metallic particle surface and, thus, an effect of a space charge layer may be achieved, thereby increasing the dielectric constant.

In this case, the metal particle included in the composite layer may be one or more of nickel (Ni), palladium (Pd), platinum (Pt), iridium (Ir), gold (Au), and selenium (Se).

The first and second dielectric materials included in the composite layer may be barium titanate ($BaTiO_3$).

One or more metallic elements of nickel (Ni), palladium (Pd), platinum (Pt), iridium (Ir), gold (Au), and selenium (Se), materials for increasing a Schottky barrier of a dielectric material and a metallic particle surface, may be added to barium titanate ($BaTiO_3$) to increase the dielectric constant of the dielectric material composition.

The metallic particle M may have a size within a range from 5 to 600 nm.

When the metallic particles M have a size less than 5 nm, a band gap of a metallic particle is increased and, thus, metallic characteristics are not present any longer because the same effect as in the case in which a non-metallic material is added is achieved.

On the other hand, when the metallic particles M has a size greater than 600 nm, as a ratio of a surface area to a volume of a metallic particle is reduced, a surface area is reduced when the same amount of metallic particles are added and a space charge layer formed around the metallic particles is reduced and, thus, there is a concern in that an effect of increasing a dielectric constant is reduced.

The metallic particles M may be included in 2 to 8 vol % of the composite layer, based on a total volume of the composite layer.

When the metallic particle is less than 2 vol %, an effect of increasing a dielectric constant may be negligible and, when the metallic particle is greater than 8 vol %, metallic particles are connected to each other and a surface area ratio with respect to a volume of the metallic particle is increased and, thus, when the same amount of metallic particles are added, there is a concern in that an effect of increasing a dielectric constant due to a reduced surface area and a reduced space charge layer formed around the metallic particles.

Then, the first and second protective layers 111a and 111c may be spaced apart by the composite layer 111b to prevent short between the internal electrodes 121 and 122 and the metallic particles M included in the composite layer 111b. When a dielectric layer is configured with only a composite layer, short may occur between the metallic particles M and the internal electrodes 121 and 122 and, there is a concern regarding degraded reliability.

The dielectric materials included in the first and second protective layers and the composite layer may be the same material. For example, the dielectric material included in the first and second protective layers may be barium titanate ($BaTiO_3$), like the dielectric material included in the composite layer.

The first and second protective layers 111a and 111c may not include a metallic particle. This is because, if a metallic particle is included, there is a concern in that the first and second protective layers 111a and 111c may not function as the aforementioned protective layer.

A thickness of the composite layer and the first and second protective layers for ensuring reliability and increasing a dielectric constant is described below.

A thickness of each of the first and second protective layers 111a and 111c according to an inventive example of the present disclosure may be equal to or greater than ⅓ of a thickness of the dielectric layer 111.

Referring to FIG. 3, when a thickness of the first protective layer 111a is Ta, a thickness of the composite layer 111b is Tb, a thickness of the second protective layer 111c is Tc, and a thickness of the dielectric layer 111 is Td, Td=Ta+Tb+Tc, Td/3≤Ta, and Td/3≤Tc are satisfied.

When the thickness Ta or Tc of the first or second protective layer is less than the thickness Td of the dielectric layer, short between the internal electrodes 121 and 122 and the metallic particles M included in the composite layer may occur and, thus, there is a concern regarding degraded reliability.

In this case, a thickness of the composite layer 111b may be equal to or greater than 400 nm and may be ⅓ or less of a thickness of the dielectric layer 111.

When the thickness of the composite layer is less than 400 nm, an effect of increasing a dielectric constant may be negligible and, when the thickness of the composite layer is greater than ⅓ of the thickness of the dielectric layer, the thickness of the protective layer is not capable of being sufficiently ensured and, thus, there is a concern regarding degraded reliability.

Figure 4:
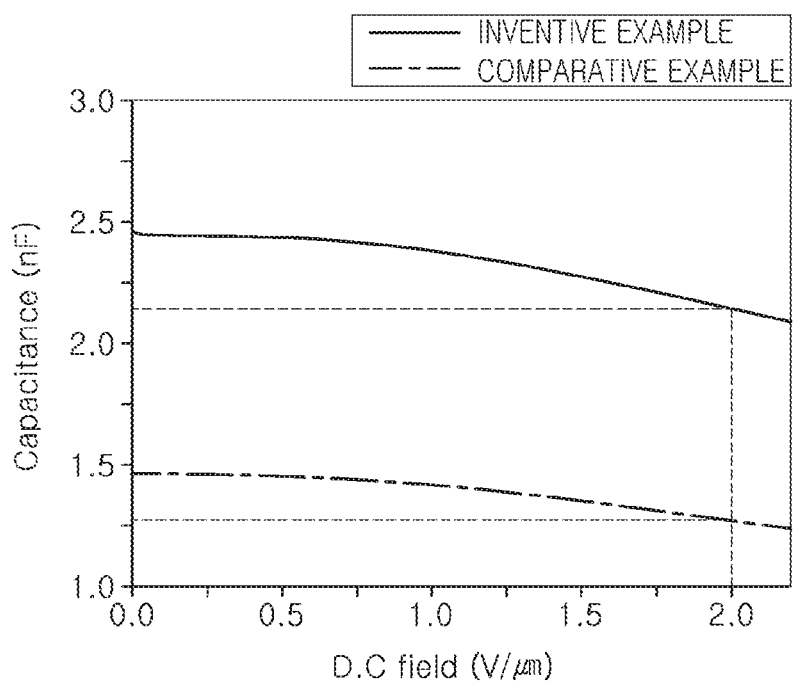
FIG. 4 is a graph showing comparison of a DC bias behavior between a comparative example and an inventive example of the present disclosure.

FIG. 4 is a graph showing comparison of a DC bias behavior between a comparative example and an inventive example of the present disclosure.

According to an inventive example of the present disclosure, the thickness of the dielectric layer was 8 μm, the thickness of the first and second protective layers was 3 μm, the thickness of the composite layer was 2 μm, a dielectric material was formed of $BaTiO_3$, and Ni included in the composite layer was 5 vol %. According to the comparative example, a dielectric layer was manufactured to a thickness of 8 μm using $BaTiO_3$ like in the prior art.

According to an inventive example of the present disclosure, a dielectric constant was increased and capacitance was increased by about 60% compared with the comparative example.

In general, when capacitance is increased by growth of particles on a dielectric material, as a DC field is increased, capacitance tends to be remarkably lowered. However, as seen from FIG. 4, according to an inventive example, a capacitance variance ratio at 2 V/μm is measured at a similar level to in the comparative example to achieve a similar DC-bias behavior to the comparative example, from which it is determined that capacitance is increased by forming a space charge layer of Ni included in a composite layer but not by growing particles on a dielectric material.

When a degraded lifetime test was performed while an electric field is increased at a predetermined time interval, it may be seen that reliability is achieved at an equivalent level or more compared with the comparative example.

Then, the internal electrodes 121 and 122 may be alternately stacked with the dielectric layer and may include the first and second internal electrodes 121 and 122. The first and second internal electrodes 121 and 122 may be alternately spaced apart across the dielectric layer 111 included in the body 110 and may be exposed out of opposite ends of the body 110, respectively. In this case, the first and second internal electrodes 121 and 122 may be electrically disconnected from each other by the dielectric layer 111 arranged between the first and second internal electrodes 121 and 122. A material of the first and second internal electrodes 121 and 122 is not particularly limited and may be formed using, for example, a noble metallic material such as palladium (Pd) or palladium-silver (Pd—Ag) alloy and a conductive paste of one or more of nickel (Ni) and copper (Cu). The conductive paste may be printed using a screen printing method, a gravure printing method, or the like and the present disclosure is not limited thereto. In addition, a thickness of the first and second internal electrodes 121 and 122 may be appropriately determined according to use or the like and is not limited thereto and, for example, the thickness of the first and second internal electrodes 121 and 122 may be 0.1 to 5 μm or 0.1 to 2.5 μm.

The external electrodes 131 and 132 may be disposed in the body 110 and may be connected to the internal electrodes 121 and 122. As illustrated in FIG. 2, the capacitor component 100 may include the first and second external electrodes 131 and 132 that are connected to the first and second internal electrodes 121 and 122, respectively. According to the present embodiment, although the capacitor component 100 includes the two external electrodes 131 and 132, the number, shape, or the like of the external electrodes 131 and 132 may be changed according to a shape, or the purpose of the internal electrodes 121 and 122.

The external electrodes 131 and 132 may be formed of any material as long as the material has electrical conductivity such as metal, a detailed material of the external electrodes 131 and 132 may be determined in consideration of electrical properties, structural stability, and so on, and the external electrodes 131 and 132 may have a multilayer structure. For example, the capacitor component 100 may include an electrode plate that contacts a body and an internal electrode and is formed of Ni, and a plating layer formed on the electrode layer.

Method of Manufacturing Capacitor Component

A method of manufacturing a capacitor component according to another embodiment of the present disclosure may include: preparing a protective layer paste including a dielectric material powder; preparing a composite layer paste including a dielectric material powder and a metallic particles; coating the protective layer paste on a support member to form a first protective layer, coating the composite layer paste on the first protective layer to form a composite layer and, then, coating the protective layer paste on the composite layer to form a second protective layer and preparing a dielectric material sheet; coating a conductive paste on the dielectric material sheet to print an internal electrode; stacking and sintering a dielectric material sheet on which the internal electrode is printed to form a body, and forming an external electrode connected to the internal electrode on the body and, in this case, a thickness of the first and second protective layers is equal to or greater than ⅓ of a thickness of the dielectric material.

Hereinafter, a repeated description of the capacitor component in the above description for each operation is omitted.

First, a paste for the protective layer including a dielectric material powder may be prepared. For example, various additives, organic solvents, plasticizers, bonding agents, and dispersants may be added to a barium titanate ($BaTiO_3$) powder, and mixed with each other to obtain a mixture. The mixture may then be dispersed to prepare a paste for the protective layer.

Then, a composite layer paste, including a dielectric material powder and a metallic particle, may be prepared. For example, various additives, organic solvents, plasticizers, bonding agents, dispersant, or the like may be added to barium titanate ($BaTiO_3$) powder particles, and any one of metallic elements of nickel (Ni), palladium (Pd), platinum (Pt), iridium (Ir), gold (Au), and selenium (Se) may be added in 2 to 8 vol % based on a total volume of the dielectric material and mixed to obtain a mixture, and the mixture is dispersed in a binder to prepare the paste for the composite layer.

Then, the protective layer paste is coated on a support member to form a first protective layer, the composite layer paste is coated on the first protective layer to form a composite layer, and the protective layer paste is coated on the composite layer to form a second protective layer, thus producing a dielectric material sheet. In this case, a thickness of each of the first and second protective layers may be equal to or greater than ⅓ of a thickness of the dielectric material sheet.

As such, the protective layer paste and the composite layer paste may be separately prepared to embody a sandwich structure of a first protective layer/composite layer/second protective layer, which advantageously ensures reliability and increases a dielectric constant. In addition, a thickness of each of the composite layer and the first and second protective layers may be easily controlled.

Then, a conductive paste for an internal sheet may be coated on the dielectric material sheet using a printing method or the like to print the internal electrode. The printing method of the conductive paste may be a screen printing method, a gravure printing method, or the like, but the present disclosure is not limited thereto.

Dielectric material sheets on which an internal electrode is printed may be stacked and sintered to form a body. In this case, the number of dielectric material sheets with the internal electrode printed thereon that are stacked may be adjusted according to a desired capacitance of the capacitor component.

Then, an external electrode may be formed in the body to complete a capacitor component.

As set forth above, according to an exemplary embodiment in the present disclosure, a capacitor component including a dielectric layer with an increased dielectric constant may be obtained without degraded reliability. However, it will be appreciated by persons skilled in the art that that the effects that could be achieved with the present invention are not limited to what has been particularly described hereinabove and other advantages of the present invention may be clearly understood from the foregoing detailed description.

While exemplary embodiments have been shown and described above, it will be apparent to those skilled in the art that modifications and variations could be made without departing from the scope of the present disclosure as defined by the appended claims.

What is claimed is:

1. A capacitor component comprising:
a body in which a dielectric layer and an internal electrode are alternately stacked; and
an external electrode disposed on the body and connected to the internal electrode,
wherein the dielectric layer includes a composite layer including a first dielectric material and a metallic particle and first and second protective layers spaced apart by the composite layer and including a second dielectric material; and
wherein a thickness of each of the first and second protective layers is equal to or greater than $\frac{1}{3}$ of a thickness of the dielectric layer.

2. The capacitor component of claim 1, wherein a thickness of the composite layer is greater than or equal to 400 nm and is less than or equal to $\frac{1}{3}$ of a thickness of the dielectric layer.

3. The capacitor component of claim 1, wherein the metallic particle includes one or more of nickel (Ni), palladium (Pd), platinum (Pt), iridium (Ir), gold (Au), and selenium (Se).

4. The capacitor component of claim 1, wherein the metallic particle has a size within a range from 5 to 600 nm.

5. The capacitor component of claim 1, wherein the metallic particle is included within a range from 2 to 8 vol % of the composite layer, based on a total volume of the composite layer.

6. The capacitor component of claim 1, wherein the first and second dielectric materials are the same material.

7. The capacitor component of claim 6, wherein the first and second dielectric materials are barium titanate ($BaTiO_3$).

8. The capacitor component of claim 1, wherein the first and second protective layers do not include a metallic particle.

9. A method of manufacturing a capacitor component, the method including:
preparing a protective layer paste including a first dielectric material powder;
preparing a composite layer paste including a second dielectric material powder and a metallic particle;
coating the protective layer paste on a support member to form a first protective layer, coating the composite layer paste on the first protective layer to form a composite layer and, then, coating the protective layer paste on the composite layer to form a second protective layer to produce a dielectric material sheet;
coating a conductive paste on the dielectric material sheet to print an internal electrode on the dielectric material sheet;
stacking and sintering the dielectric material sheet on which the internal electrode is printed to form a body; and
forming an external electrode connected to the internal electrode on the body,
wherein a thickness of each of the first and second protective layers is equal to or greater than $\frac{1}{3}$ of a thickness of the dielectric material sheet.

10. The method of claim 9, wherein the metallic particle includes one or more of nickel (Ni), palladium (Pd), platinum (Pt), iridium (Ir), gold (Au), and selenium (Se).

11. The method of claim 9, wherein the first and second dielectric materials are the same material.

12. The method of claim 11, wherein the first and second dielectric materials are barium titanate ($BaTiO_3$).

13. The method of claim 9, wherein a thickness of the composite layer is greater than or equal to 400 nm and is less than or equal to $\frac{1}{3}$ of a thickness of the dielectric layer.

* * * * *